United States Patent
Balko et al.

(10) Patent No.: US 7,290,419 B2
(45) Date of Patent: Nov. 6, 2007

(54) KEY SYSTEM FOR A MOTOR VEHICLE

(75) Inventors: Peter Balko, Braunschweig (DE); Dieter Meyer, Wolfsburg (DE); Peter Plott, Wolfsburg (DE); Axel Anders, Osloss (DE); Ulrich Lammel, Wettstetten (DE); Gustav Hofmann, Braunschweig (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 11/231,376

(22) Filed: Sep. 20, 2005

(65) Prior Publication Data

US 2006/0010944 A1 Jan. 19, 2006

Related U.S. Application Data

(63) Continuation of application No. PCT/EP2004/003717, filed on Apr. 7, 2004.

(30) Foreign Application Priority Data

May 21, 2003 (DE) ................ 103 22 853

(51) Int. Cl.
*A45C 11/32* (2006.01)
(52) U.S. Cl. ..................... 70/456 R; 70/408
(58) Field of Classification Search .............. 70/456 R, 70/256, 257, 456 B, 459, 393, 399, 408; 206/67.1, 37.2, 37.7; D8/347
See application file for complete search history.

(56) References Cited

U.S. PATENT DOCUMENTS 3,349,589 A * 10/1967 Fricke ................. 70/395
3,605,464 A * 9/1971 Ostrager .............. 70/414
4,888,970 A * 12/1989 Kinzler et al. ......... 70/456 R
5,561,331 A * 10/1996 Suyama et al. ......... 307/10.3
6,216,501 B1 * 4/2001 Marquardt et al. ...... 70/252
6,314,775 B2 * 11/2001 Schwab ............... 70/456 R
6,460,386 B1 * 10/2002 Watanuki et al. ........ 70/456 R
6,553,802 B1 * 4/2003 Jacob ................. 70/456 R
2004/0237613 A1 * 12/2004 Shimura et al. ......... 70/456 R
2005/0223766 A1 * 10/2005 Hashimoto et al. ...... 70/456 R
2006/0150696 A1 * 7/2006 Eychenne et al. ....... 70/456 R
2007/0000295 A1 * 1/2007 Donner et al. .......... 70/271

FOREIGN PATENT DOCUMENTS

| DE | 195 05 190 A1 | 2/1995 |
|---|---|---|
| EP | 0 987 389 A1 | 8/1999 |
| EP | 1 207 255 A2 | 11/2001 |
| EP | 1 283 315 A1 | 8/2002 |

OTHER PUBLICATIONS

International Search Report; PCT/EP2004/003717; 3 Pgs, Jul. 30, 2004.
English translation of International Preliminary Examination Report for Application PCT/EP2004/003717 Filed Apr. 7, 2004, 8 pages, Issued Apr. 18, 2006.

* cited by examiner

*Primary Examiner*—Jennifer H. Gay
*Assistant Examiner*—Kristina R Gluchowski
(74) *Attorney, Agent, or Firm*—Baker Botts L.L.P.

(57) ABSTRACT

A key system (1) for a motor vehicle comprises transmitter electronics arranged inside a housing (2) and used for the contactless locking and/or unlocking of a door of the motor vehicle and/or operation of the motor vehicle. The system further comprises an emergency key (3) for mechanically locking and/or unlocking the door of the motor vehicle and/or for the operation of the motor vehicle. The emergency key is received inside the housing (2) in a substantially complete manner.

14 Claims, 5 Drawing Sheets

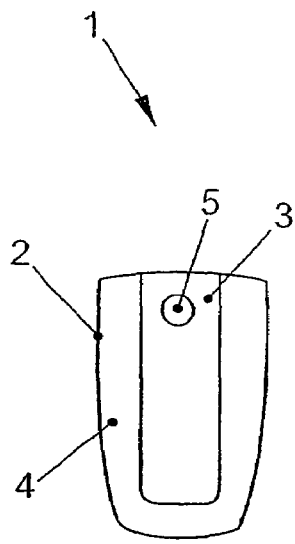
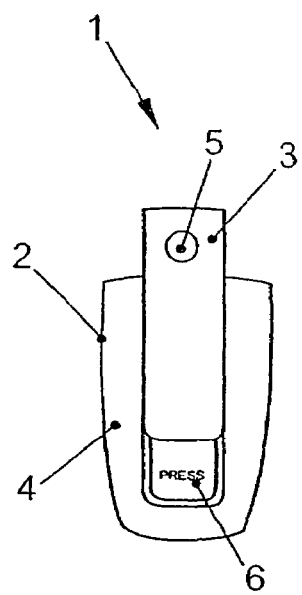
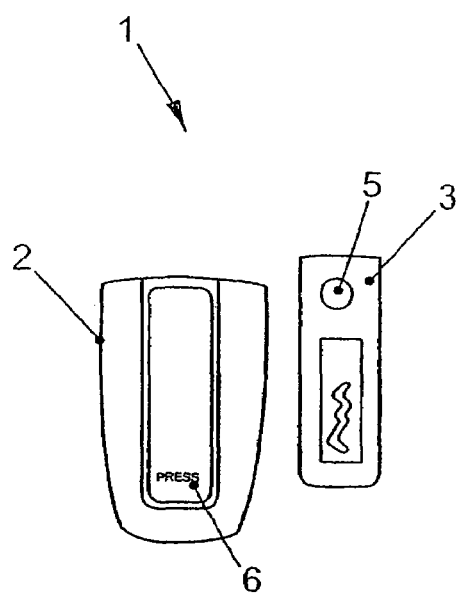
FIG. 1   FIG. 2   FIG. 3
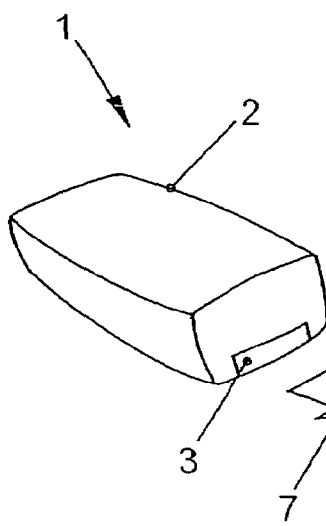
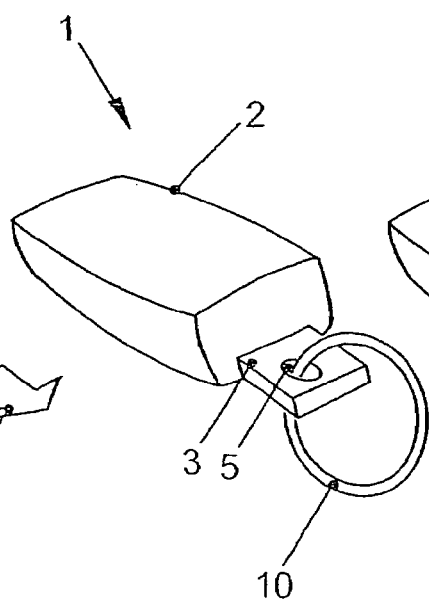
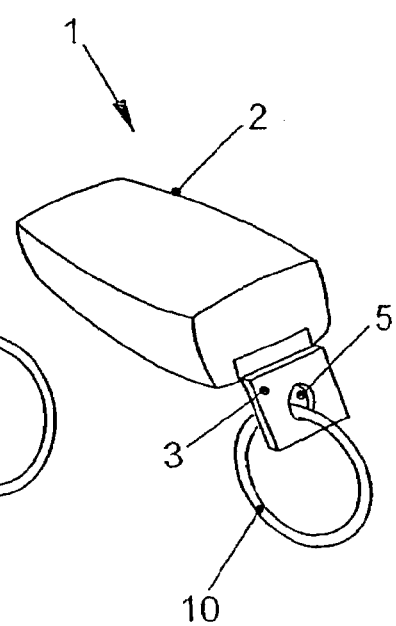
FIG. 4   FIG. 5   FIG. 6

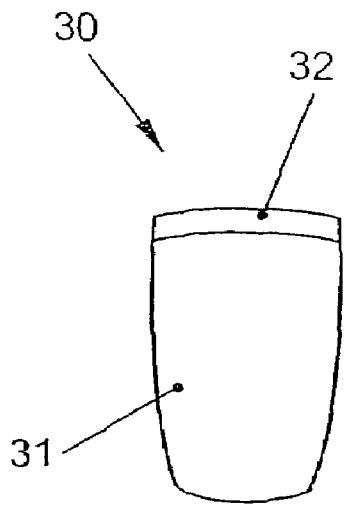 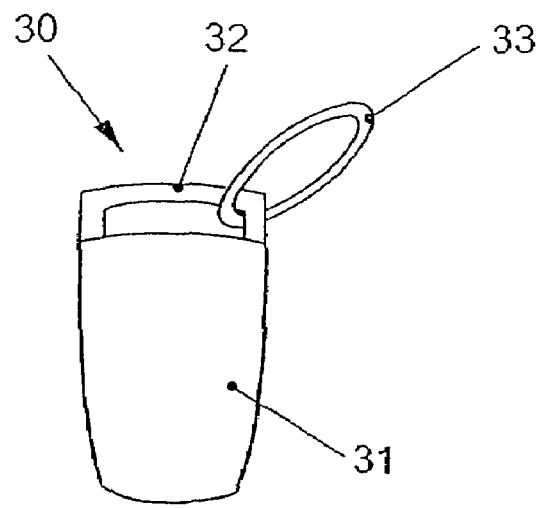
FIG. 8  FIG. 9
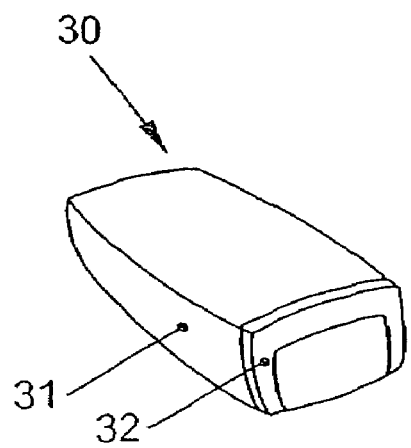 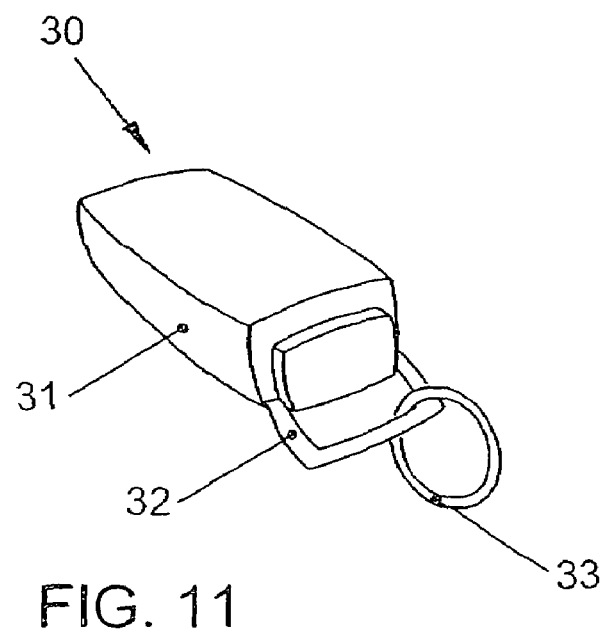
FIG. 10  FIG. 11

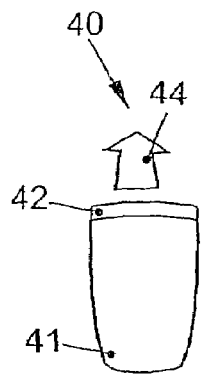
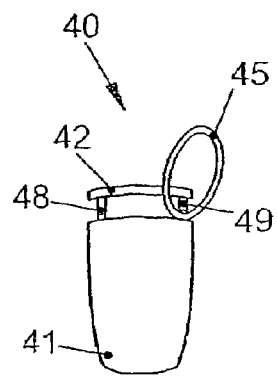
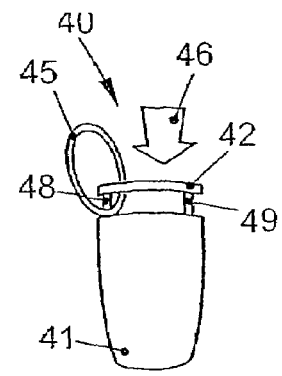
FIG. 12          FIG. 13          FIG. 14
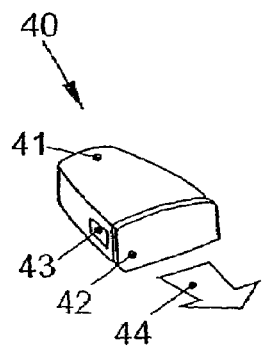
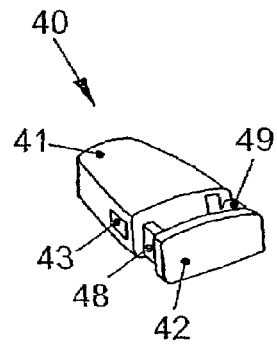
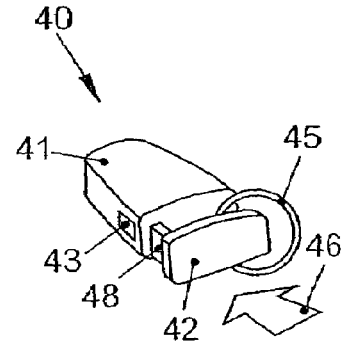
FIG. 15          FIG. 16          FIG. 17
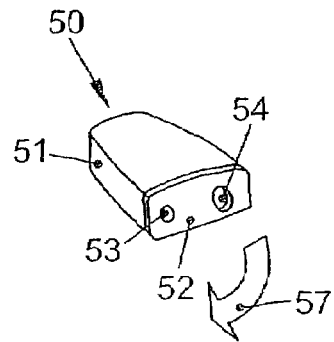
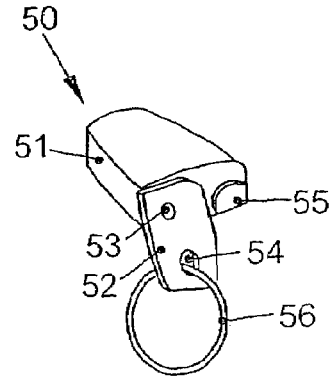
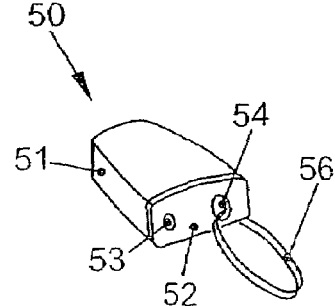
FIG. 18          FIG. 19          FIG. 20

KEY SYSTEM FOR A MOTOR VEHICLE

CROSS-REFERENCE TO RELATED APPLICATION

This application is a continuation of co-pending International Application No. PCT/EP2004/003717 filed Apr. 7, 2004 which designates the United States of America, and claims priority to German Application No. 103 22 853.5 filed May 21, 2003, the contents of which are hereby incorporated by reference in their entirety.

TECHNICAL FIELD

The invention concerns a key system for a vehicle with transmitting electronics arranged in housing for contactless locking and/or unlocking of a door of a vehicle and/or operation of a vehicle, and with an emergency key for mechanical locking and/or unlocking of the door of the vehicle and/or for operation of the vehicle.

BACKGROUND

The task of the invention is to improve such a key system.

The aforementioned task is solved by a key system for a vehicle with transmitting electronics arranged in a housing for contactless locking and/or unlocking of a door of a vehicle and/or for operation of a vehicle, as well as an emergency key for mechanical locking and/or unlocking of the door of the vehicle and/or operation of the vehicle, in which the emergency key can be accommodated (essentially) fully in the housing (and advantageously locked into this position).

A vehicle according to the invention is especially a ground vehicle, usable individually in traffic. The vehicles according to the invention are not particularly restricted to ground vehicles with an internal combustion engine. A door (of a vehicle) according to the invention can be a door, front or rear hatch or trunk. An emergency key designed for mechanical operation of the vehicle according to the invention corresponds, in particular, to a mechanical ignition key.

For essentially full accommodation of the emergency key in the housing of the key system, the emergency key, in an advantageous embodiment of the invention, can be accommodated essentially fully in one edge of the housing.

In another advantageous embodiment of the invention, the emergency key and the housing are fully separable from each other. That the emergency key and the housing are fully separable from each other according to the invention means especially that the emergency key and the housing can be fully separated from each other without destruction and without a tool. This means, in particular, that the emergency key and the housing can be fully separated from each other for use of the emergency key without difficulty.

In another advantageous embodiment of the invention, the emergency key is designed to be mounted on a key ring.

In another advantageous embodiment of the invention, the emergency key has a closure element for mechanical locking and/or unlocking of the door of the vehicle and/or for operation of the vehicle and a receiving element appropriate to receive a key ring. The closing element and the receiving element in another advantageous embodiment of the invention are then movably connected to each other, advantageously by means of a link, especially by means of a hinge.

In another advantageous embodiment of the invention, the closure element or emergency key has a closure piece for mechanical locking and/or unlocking of the door of the vehicle and/or for operation of the vehicle and an insertion element, into which the closure piece can be inserted.

In another advantageous embodiment of the invention, the emergency key, has a receiving element appropriate to receive a key ring.

In another advantageous embodiment of the invention, the insertion element and the receiving element are movably connected to each other, advantageously by means of a link, especially a hinge.

In another advantageous embodiment of the invention, the emergency key can be locked in a first locking position and in a second locking position different from the first locking position in the housing.

The emergency key, in another advantageous embodiment of the invention in the first locking position, is essentially fully in the housing and advantageously in the second locking position (especially only in this position), is accommodated in the housing to the extent that the receiving element for a key ring (for the purpose of threading) can be reached.

In another advantageous embodiment of the invention, the emergency key in the second locking position (especially only in this position) is accommodated in the housing to the extent that the receiving element can be pivoted.

In another advantageous embodiment of the invention, the emergency key in the second locking position (especially only in this position) is accommodated in the housing, so that (only) the closure element is essentially accommodated in the housing.

In another advantageous embodiment of the invention, the emergency key can be pushed into the housing when the second locking position is released.

In another advantageous embodiment of the invention, the emergency key is separable from the housing, when released in the second locking position.

In another advantageous embodiment of the invention, the key system has a pushbutton to release the second locking position.

It can be prescribed that the housing have a receiving element appropriate to accommodate a key ring. The receiving element can be connected movably to the housing and, at least in one closure position, in which the receiving element forms a closed unit with the housing, and can be arranged in a threading position, in which a key ring can be threaded onto the receiving element.

The aforementioned task is additionally solved by a key system for a vehicle with transmitting electronics arranged in the housing for contactless locking and/or unlocking of a door of the vehicle and/or for operation of the vehicle, in which the housing has a receiving element suitable for receiving a key ring, which is movably connected to the housing and can be arranged, at least one closure position, in which the receiving element forms a closed unit with the housing, and in a threading position, in which a key ring can be threaded onto the receiving element.

In advantageous embodiment of the invention, the key system has an emergency key for mechanical locking and/or unlocking of the door of the vehicle and/or operation of the vehicle, in which the emergency key can be accommodated, at least partially, preferably essentially fully, in the housing.

BRIEF DESCRIPTION OF THE DRAWINGS

Additional advantages and details are apparent from the following description of practical examples. In them:

FIG. 1 shows a practical example of a key system in a first locking position.

FIG. 2 shows the practical example of the key system according to FIG. 1 in a second locking position.

FIG. 3 shows the practical example of the key system according to FIG. 1 with an emergency key separated from the housing.

FIG. 4 shows the practical example of the key system according to FIG. 1 in a first locking position in a three-dimensional view.

FIG. 5 shows the practical example of the key system according to FIG. 1 in a second locking position in a three-dimensional view.

FIG. 6 shows the practical example of the key system according to FIG. 1 in a second locking position in a three-dimensional view.

FIG. 8 shows another practical example of a key system.

FIG. 9 shows a practical example of the key system according to FIG. 8 with a key ring.

FIG. 10 shows the practical example of a key system according to FIG. 8 in a three-dimensional view.

FIG. 11 shows the practical example of a key system according to FIG. 9 in a three-dimensional view.

FIG. 12 shows another practical example of a key system.

FIG. 13 shows the practical example of the key system according to FIG. 12 in an opened state.

FIG. 14 shows the practical example of the key system according to FIG. 12 with a threaded key ring.

FIG. 15 shows the practical example of the key system according to FIG. 12 in a three-dimensional view.

FIG. 16 shows the practical example of the key system according to FIG. 13 in a three-dimensional view.

FIG. 17 shows the practical example of the key system according to FIG. 14 in a three-dimensional view.

FIG. 18 shows another practical example of the key system in a three-dimensional view.

FIG. 19 shows the practical example of the key system according to FIG. 18 in an open state.

FIG. 20 shows the practical example of the key system according to FIG. 18 in a closed state with a threaded key ring.

DETAILED DESCRIPTION

Figure 7:
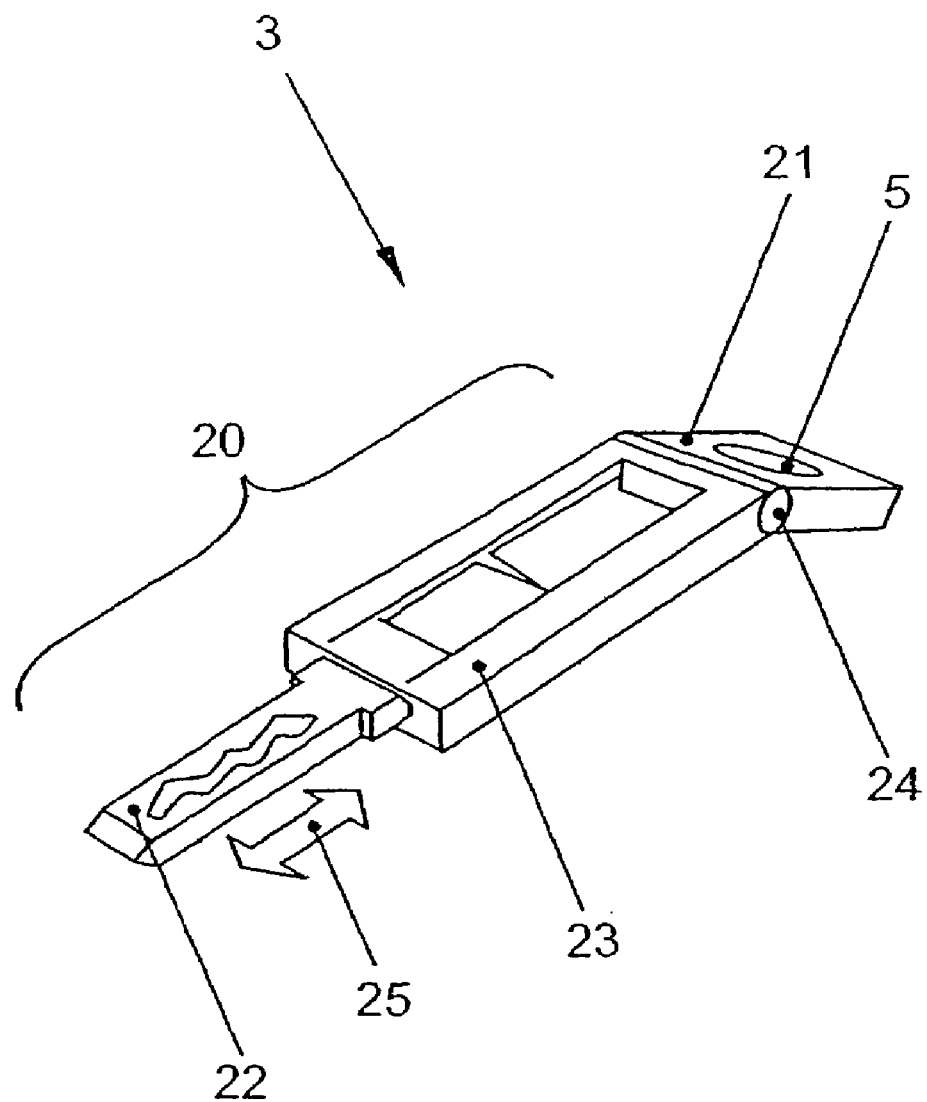
FIG. 7 shows a practical example of an emergency key.

FIG. 1 shows a practical example for a key system 1 situated in a first locking position for a vehicle, with transmitting electronics arranged in a housing 2 for contactless locking and/or unlocking of the door of a vehicle and/or for operation of the vehicle, and with an emergency key 3 for mechanical locking and/or unlocking of the door of the vehicle and/or operation of the vehicle. The emergency key 3 is fully accommodated in the upper edge 4 of housing 2. The emergency key 3 has an opening 5, into which, as shown in FIG. 5 and FIG. 6, a key ring 10 can be threaded.

The emergency key 3, as shown in FIG. 2, can be partly pushed out from housing 2 into a second locking position. In this second locking position, the opening 5, as shown in FIG. 5 and FIG. 6, a key ring 10 can be threaded. In addition, the emergency key in the second locking position releases a pushbutton 6. By pressing pushbutton 6, a locking mechanism in the housing 2 is released, so that housing 2 and the emergency key are separable and can form two separate objects, as shown in FIG. 3.

FIG. 4, FIG. 5, and FIG. 6 show the key system 1 in a three-dimensional view. The key system 1 in FIG. 4 is shown in its first locking position. Arrow 7 shows that the emergency key 3 can be pushed (partially) from housing 2 into a second locking position. FIG. 5 and FIG. 6 show the key system in its second locking position, in which a key ring 10 is threaded through opening 5.

FIG. 7 shows the emergency key 3 in a three-dimensional view. The emergency key 3 has a closing element 20 with a closing piece 22 for mechanical locking and/or unlocking of the door of the vehicle and/or for operation of the vehicle and with an insertion element 23, into which the closure element 22, as indicated by the double arrow 25, can be pushed in and out. The insertion element 23 is connected to tilt via a hinge 24 to a receiving element 21. In this way, the hazard of injury during an accident can be reduced. The receiving element 21 in FIG. 6 of the emergency key pushed into the second locking position in the housing 2 is tilted back. An opening 5 is arranged in the receiving element 21.

FIG. 8 shows another practical example of a key system 30 for a vehicle, FIG. 9 shows the practical example of the key system 30 according to FIG. 8 with a key ring 33, FIG. 10 shows the practical example of the key system 30 according to FIG. 8 in a three dimensional view and FIG. 11 shows the practical example of the key system 30 according to FIG. 9 in a three-dimensional view. The key system 30 has transmitting electronics arranged in a housing 31 for contactless locking and/or unlocking of the door of the vehicle and/or for operation of the vehicle, as well as a loop-like receiving element 32, appropriate to accommodate a key ring 33, which is connected movably to housing 31.

In the position depicted in FIG. 8 and FIG. 10, the loop-like receiving element 32 is flush with the surface of housing 31, so that it does not protrude beyond the basic outline of housing 31. The loop-like receiving element 32, as shown in FIG. 9 and FIG. 11, can be tilted back, so that the key ring 33 can be threaded into the receiving element.

Another practical example of a key system 40 is shown in FIG. 12, FIG. 13 shows the practical example of the key system 40 according to FIG. 12 in an opened state, FIG. 14 shows the practical example of the key system 40 according to FIG. 12 with a threaded key ring 45, FIG. 15 shows the practical system of the key system 40 according to FIG. 12 in a three-dimensional view, FIG. 16 shows the practical example of the key system 40 according to FIG. 3 in a three-dimensional view, but without the key ring 45, for reasons of clarity, and FIG. 17 shows the practical example of the key system 40 according to FIG. 14 in a three-dimensional view. The key system 40 has transmitting electronics arranged in a housing 41 for contactless locking and/or unlocking of a door of the vehicle and/or for operation of the vehicle, as well as receiving element 42, suitable for receiving key ring 45, which is movably connected to housing 41.

In the position depicted in FIG. 12 and FIG. 15, the receiving element 42 covers a face of housing 41 flush. The housing has a pushbutton 43. If the pushbutton 43 is pressed, the receiving element 42 is moved in the direction of arrow 44 into a position depicted in FIG. 13 and FIG. 16. The receiving element 42 has a long retaining pin 48, which, in the position depicted in FIG. 13 and FIG. 16, connects the receiving element 42 to housing 41, and a short retaining pin 49. In this position, the key ring 45, as shown in FIG. 13, can be threaded between housing 41 and the short retaining pin 49.

After threading of key ring 45, the receiving element 42 can be moved in the direction of arrow 46 on housing 41, so that both the long retaining pin 48 and the short retaining pin 49 connect the receiving element 42 to housing 41 and the key ring 45 is enclosed.

FIG. 18 shows another practical example of a key system 50 in a three-dimensional view. The key system 50 has transmitting electronics arranged in a housing for contactless locking and/or unlocking of the door of a vehicle and/or for operation of the vehicle, as well as a receiving element 52, suitable for accommodating a key ring 56 with an opening 54. The receiving element 52 is connected by means of a pin 53 to housing 51, pivotable in the direction of arrow 57.

FIG. 19 shows the key system 50 in an opened state, i.e., after pivoting of he receiving element 52. In this state, the key ring 56 can be threaded into opening 54. After threading of the key ring 56, the receiving element 52 can be pivoted back, in which case a recess 55 is provided for the key ring 56 on housing 51. FIG. 20 shows the key system 50 in this newly closed state with the threaded key ring 56.

Figure 21:
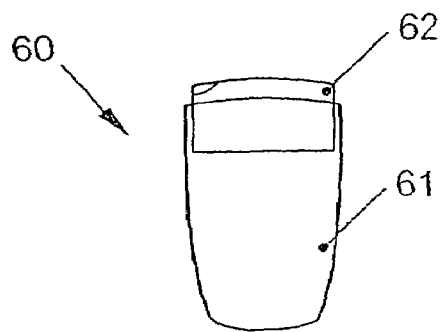
FIG. 21 shows another practical example of the key system.
Figure 22:
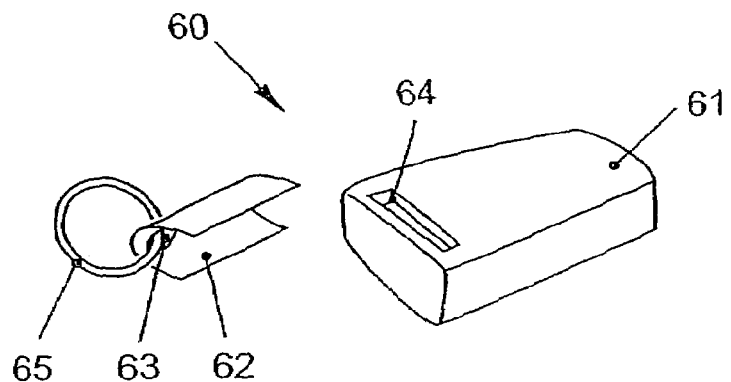
FIG. 22 shows the practical example of the key system according to FIG. 21 in an opened state in a three-dimensional view.

FIG. 21 shows another practical example of a key system 60. The key system 60 has transmitting electronics arranged in a housing 61 for contactless locking and/or unlocking of a door of a vehicle and/or for operation of a vehicle, and a receiving element 62, removable from housing 61, suitable for accommodating a key ring 65. FIG. 22 shows the key system 60 in a three-dimensional view, in which the receiving element 62 is separated from housing 61. The receiving element 62 has an opening 63, through which the key ring 65 is threaded.

Figures 23, 24, 25:
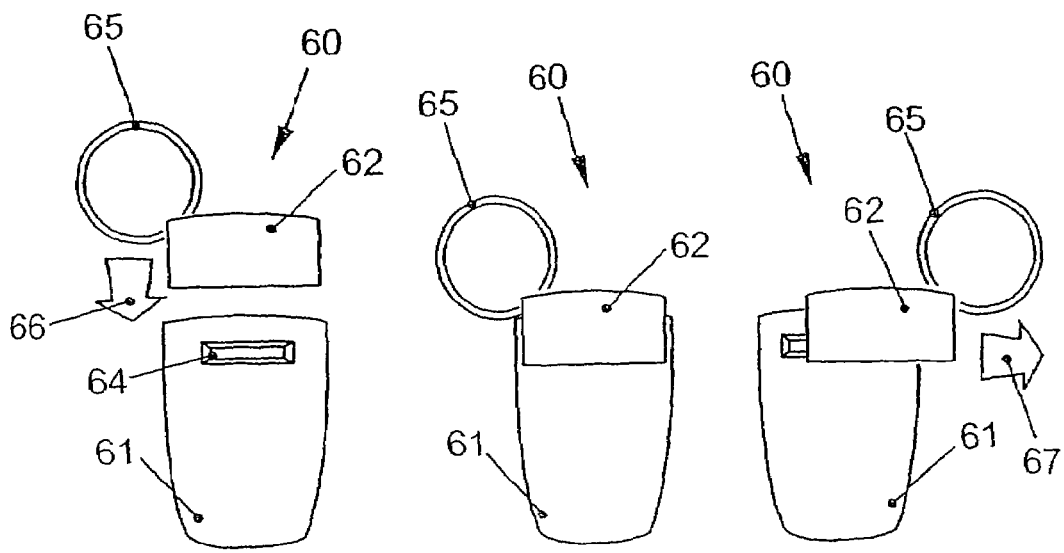
FIG. 23 shows the practical example of the key system according to FIG. 21 in an opened state.
FIG. 24 shows the practical example of the key system according to FIG. 21 in a closed state with a threaded key ring.
FIG. 25 shows the practical example of the key system according to FIG. 21 in a half-opened state.

The housing 61 has a recess 64, into which the receiving element 62 can be snapped when it is pushed, as shown in FIG. 23, in the direction of arrow 66, onto housing 61. FIG. 24 shows the key system 60 in a closed state, i.e., after the receiving element 62 has been pushed onto housing 61, with the threaded-on key ring 65.

FIG. 25 shows the key system 60 in a half-opened state. By pushing the receiving element 62 relative to housing 61 in the direction of arrow 67, the receiving element 62 can be separated from housing 61.

The key systems 30, 40, 50 and 60 each have an emergency key (not shown) for mechanical locking and/or unlocking of the door of a vehicle and/or operation of a vehicle, in which the emergency key can be accommodated, at least partly and advantageously essentially fully, in housing 31, 41, 51 or 61.

Especially in connection with the key systems 30, 40, 50 and 60, it can be prescribed to design the housings 31, 41, 51 and 61 at least in two parts, i.e., from at least two parts, in which the two parts of housing 31, 41, 51 or 61 permit opening of housing 31, 41, 51 or 61 by tilting a part of the opening or are completely separable from each other. The fact that the two parts of housing 31, 41, 51 and 61 are fully separable from each other means, according to the invention, in particular, that the two parts of housing 31, 41, 51 and 61 can be separated from each other fully, free of destruction and without a tool. This means that the two parts of housing 31, 41, 51 and 61 are fully separable from each other for a user of the key without difficulty. If the housing 31, 41, 51 or 61 is opened, an emergency key can be removed.

What is claimed is:

1. A key system for a vehicle comprising transmitting electronics arranged in a housing for contactless locking and/or unlocking of a door of the vehicle and/or for operation of the vehicle, an emergency key for mechanical locking and/or unlocking of the door of the vehicle and/or for operation of the vehicle which is accommodated fully in said housing, wherein the emergency key is be locked in a first locking position and in a second locking position different from the first locking position in the housing, the emergency key comprises an apertured receiving element and wherein the emergency key in the first locking position is accommodated fully in the housing and is flush with the housing and the receiving element can not be reached and the emergency key in the second locking position is accommodated in the housing to the extent that the receiving element is reached for threading-on of a key ring.

2. A key system according to claim 1, wherein the emergency key is accommodated essentially fully in one edge of said housing.

3. The A key system according to claim 1, wherein the emergency key and housing are fully separable from each other.

4. A key system according to claim 1, wherein the emergency key is designed to accommodate a key ring.

5. A key system according to claim 1, wherein the emergency key comprises a closure element for mechanical locking and/or unlocking of the door of the vehicle and/or for operation of the vehicle, and the receiving element, appropriate to receive a key ring.

6. A key system according to claim 5, wherein the closure element and the receiving element are connected movably to each other.

7. A key system according to claim 5, wherein the closure element and the receiving element are connected to each other by means of a link.

8. A key system according to claim 1, wherein the emergency key has a closure piece for mechanical locking and/or unlocking of the door of the vehicle and/or for operation of the vehicle, and an insertion element, into which the closure piece can be inserted.

9. A key system according to claim 1, wherein the emergency key in the first locking position is fully accommodated in the housing.

10. A key system according to claim 1, wherein the emergency key in the second locking position is accommodated in the housing to the extent that the receiving element can be pivoted.

11. A key system according to claim 1, wherein the emergency key in the second position is accommodated in the housing to the extent that a closure element is accommodated in the housing.

12. A key system according to claim 1, wherein the emergency key is separable from the housing during a release of the emergency key from the second locking position.

13. A key system according to claim 1, comprising a pushbutton for releasing the emergency key from the second locking position.

14. A key system for a vehicle comprising transmitting electronics arranged in a housing for contactless locking and/or unlocking of a door of the vehicle and/or for operation of the vehicle, an emergency key having a closure element for mechanical locking and/or unlocking of the door of the vehicle and/or for operation of the vehicle which is accommodated fully in said housing, wherein the emergency key can be locked in a first locking position complete flush with said housing and in a second locking position different from the first locking position in the housing, wherein when the emergency key is in the second position a push button arranged within the housing is accessible wherein upon operation of the push button the emergency key is released from the housing and wherein the push button is covered by the emergency key when the emergency key is in the first locking position.

* * * * *